Patented Feb. 15, 1944

2,342,073

UNITED STATES PATENT OFFICE 2,342,073

ISOMERIZING HYDROCARBONS

Harry A. Cheney, Berkeley, Calif., assignor to Shell Development Company, San Francisco, Calif., a corporation of Delaware No Drawing. Application January 6, 1942, Serial No. 425,779

11 Claims. (Cl. 260—683.5)

The present invention relates to the isomerization of saturated hydrocarbons, and relates more particularly to an improved process for the catalytic conversion of normal or branched chain saturated hydrocarbons to branched and more highly branched chain saturated hydrocarbons.

It is well known that the isomerization of saturated hydrocarbons can be catalyzed by the aluminum halides. It is also known that the presence of a hydrogen halide promoter accelerates the reaction. The aluminum halides, however, per se, even in the presence of the hydrogen halide promoter, are not entirely satisfactory catalysts for hydrocarbon isomerization. At low temperatures the isomerization rate is usually too slow for practical consideration and at higher temperatures these catalysts tend to cause degradation reactions which lead to the formation of by-products which, in turn, polymerize and undergo other secondary reactions. These by-products, even when formed in relatively small amounts, quickly coat the catalyst particles, preventing efficient contact, and cause the particles of aluminum halide to agglomerate into sticky lumps.

In the known catalytic isomerization processes, the catalyst is generally employed in a solid state in the form of fragments, pellets, or the like. The use of such catalysts, although satisfactory in some cases, has certain disadvantages. Thus the available degree of contact between the reactants and the solid catalyst is generally insufficient to enable efficient large scale operation in the liquid phase. This is particularly important in view of the fact that the isomerization of hydrocarbons having more than four carbon atoms to the molecule is generally effected more advantageously in the liquid phase. A further disadvantage often inherent in the use of solid catalysts resides in the difficulty of efficiently controlling the catalyst bed temperature due to the poor heat conductivity of most of the available solid isomerization catalysts. A considerable portion of these solid isomerization catalysts often consists of inert support material, thereby requiring the use of large reaction zones for relatively small amounts of the active catalyst constituent. It is therefore readily apparent that an isomerization process comprising the use of a catalyst which is not only effective in its ability to catalyze the isomerization of the less readily degraded hydrocarbons, but which will maintain its fluidity at temperatures sufficiently low to enable it to be used in the liquid state for the treatment of the more readily degraded hydrocarbons, such as pentane, is highly advantageous.

I have found that the fluid melts consisting of ternary mixtures composed of a molecular excess of a halide of aluminum, a halide of sodium and a halide of potassium are particularly desirable as catalysts for the isomerization of hydrocarbons. The use of these fluid mixtures as catalysts for the isomerization of hydrocarbons eliminates many of the disadvantages inherent in the use of the solid catalysts.

In accordance with the process of the invention, the hydrocarbon to be isomerized, alone or in admixture with one or more hydrocarbons which may or may not be capable of isomerization under the conditions of execution of the process, and/or in the presence of one or more non-hydrocarbon diluents, is contacted under isomerizing conditions of temperature and pressure with a fluid melt consisting of a ternary mixture composed of a halide of aluminum, a halide of sodium and a halide of potassium.

Of the available aluminum halides, aluminum chloride and aluminum bromide are generally used. The alkali metal halide components are also generally the chlorides and/or bromides. It is not essential, however, that the halides of the alkali metal components and aluminum correspond. Thus I may use a suitable alkali metal bromide and/or chloride in combination with aluminum bromide and/or chloride. The ratio of the components of the ternary melts to one another may vary within the scope of the invention in accordance with the particular characteristics of the catalyst desired, operating conditions, and the like. It is essential, however, that the aluminum halide be present in all cases in molecular excess. Catalyst melts particularly advantageous because of their ability to catalyze the hydrocarbon isomerization and because of their ability to maintain their fluidity at relatively low temperatures, for example, below about 110° C., consist of the ternary mixtures of aluminum chloride, sodium chloride and potassium chloride, wherein the content in mol per cent of the individual components is comprised within the following approximate limits: $AlCl_3$, 57 to 70; $NaCl$, 7.5 to 39; $KCl$, 0.5 to 27. A particularly effective catalyst is the ternary melt consisting of $AlCl_3$-$NaCl$-$KCl$ in the approximate weight proportions of 8:1:1 (66.2:19.2:14.6 mol per cent), respectively. It is to be understood that the proportions of the three components of the melts as given throughout the specification and claims refer to the amounts in which these are mixed to obtain the catalyst, and that once they are mixed they combine in part with one another to form complex compounds. Since the chlorides of sodium and potassium combine readily with aluminum chloride, it is seen that the catalyst melt consisting of $AlCl_3$, NaCl and KCl in the approximate weight proportion of 8:1:1, respectively, contains about 33 mol per cent of free $AlCl_3$. It is believed that the effectiveness of this particular melt as an isomerization catalyst is due to some degree to this ratio of free aluminum chloride to aluminum chloride-alkali metal complexes.

The summation of the advantages inherent in the above molten ternary mixtures is generally not possessed by ternary melts comprising an alkaline earth metal halide as one of the components, or by binary mixtures consisting of an aluminum halide and an alkali metal halide. These mixtures, among other disadvantages, generally have too high a melting point to permit their efficient use in the liquid state as an isomerization catalyst. Thus the eutectic of a binary mixture of aluminum chloride and sodium chloride has a melting point above 120° C., and aluminum chloride and potassium chloride above 150° C. Since the maintenance of the melts at the exact composition corresponding to the eutectic during continuous operation is extremely difficult, if not impossible, and since in addition to this the process must be executed at a temperature in excess of the melting point of the catalyst to avoid freezing of any part thereof within the system, it is apparent that these higher melting mixtures are not suited to the treatment of the more readily degraded paraffin hydrocarbons such as, for example, normal pentane which is substantially completely decomposed in the presence of these catalysts at temperatures of 120° C. and higher. The ternary melts used in the process of the invention, on the other hand, possess not only appreciable catalytic activity but are fluid at relatively low temperatures. Thus the catalyst melt consisting of the chlorides of aluminum, sodium and potassium, in the approximate weight ratio of 8:1:1 melts at a temperature somewhat below 90° C. The lower temperatures at which these catalysts can be employed in the liquid state not only enables their use in the isomerization of the higher paraffin hydrocarbons but enables the attainment of equilibrium mixtures of normal and iso-paraffin hydrocarbons containing greater amounts of isoparaffins than would be possible with the use of the higher melting binary mixture, even if excessive degradation did not seriously mitigate against the latter's use. It is further to be noted that even in the higher temperature ranges which may be resorted to, for example, in the vapor phase isomerization of normal butane, the ternary catalyst melts employed in the process of the invention possess distinct advantages over higher melting mixtures. These advantages comprise a greater degree of fluidity, assuring improved contact of reactants and catalyst and greatly facilitating important steps of the process such as stirring of the catalyst in the reaction zone, and circulation of the catalyst within the system. The use of the ternary melt consisting of the chlorides of aluminum, sodium and potassium permit greater variations in catalyst composition without encountering the danger of freezing part of the catalyst in the reaction zone. This increased range in permissible catalyst composition also enables the properties of the melt, such as its catalytic activity, to be modified to a greater degree. This is highly advantageous since it is often desirable to modify the activity of a catalyst melt in conformity with changes in operating conditions or changes in the feed to the process.

The process of the invention is of particular value as applied to the catalytic treatment of normal butane and normal pentane to convert these paraffinic hydrocarbons to isobutane and isopentane respectively. The charge to the process need not, however, consist of substantially a single hydrocarbon. Thus the process of the invention may advantageously be applied to the isomerization of normal butane and/or normal pentane-containing mixtures. For example, suitable starting materials are mixtures comprising, besides a substantial amount of normal butane and/or normal pentane, one or a plurality of other hydrocarbons which may or may not be capable of isomerizing under the conditions of execution of the process. The invention thus provides a practical process for converting the normal butane and normal pentane contents of commercial hydrocarbon mixtures such as are obtained from natural gases, petroleum distillates, cracked distillates, etc., to their branched chain isomers. Especially suitable mixtures of hydrocarbons are the so-called butane-butylene fractions and pentane-amylene fractions from which unsaturated hydrocarbons have been substantially removed. Treatment of the mixtures obtained, for instance as by-products in the sulfuric acid alkylation of isoparaffins results in materially increasing their content of branched chain isomers and converting them to suitable raw materials for re-use in the alkylation process. The process of the invention, however, is in no wise limited to the treatment of normal butane and/or pentane hydrocarbons or hydrocarbon mixtures containing them. The process of the invention is applicable generally to the catalytic isomerization of isomerizable saturated hydrocarbons. While the process is particularly adapted to the isomerization of saturated open chain or paraffin hydrocarbons it can also be advantageously applied to the isomerization of methyl cyclopentane, dimethyl cyclopentane, methyl cyclohexane, and similar naphthenic hydrocarbons. Mixtures of saturated hydrocarbons such as straight run gasoline, casing head gasoline, etc., containing, for example, appreciable quantities of normal butane, normal pentane, cyclohexane, methyl cyclohexane, etc., may be advantageously treated to produce products suitable for alkylation with olefins and which have improved ignition characteristics.

The hydrocarbon or hydrocarbon mixtures treated are preferably substantially free of materials which are prone to undergo side reactions such as degradation, polymerization, etc., or which combine with components of the catalyst melt under the reaction conditions. Olefins, diolefins, aromatic hydrocarbons or other detrimental impurities in the hydrocarbon or hydrocarbon mixture to be treated are preferably removed prior to isomerization by a suitable pretreatment which may comprise one or more of such steps as mineral acid refining, hydrogenation, alkylation, treatment with a part of the spent catalyst, solvent extraction, etc. Water and hydrogen sulfide are detrimental and are excluded to as great a degree as practical.

The isomerization is preferably effected in the presence of a hydrogen halide promoter such as, for example, hydrogen chloride. This may be admixed with the hydrocarbon charge prior to its introduction into the reaction zone or may be passed in part or in its entirety directly into the reaction zone at one or a plurality of intermediate points thereof. The amount of hydrogen halide used may vary widely in accordance with the nature of the charge, operating conditions, etc. In general, an amount of hydrogen chloride equal to from about 0.3% to about 10% of the hydrocarbon charge is found to be sufficient. Higher proportions of hydrogen halide may, however, be used.

Gases such as $H_2$, $N_2$, $CH_4$, $CO_2$, etc., may if desired be present in the reaction zone. When using hydrogen or other gases, these may be separately heated prior to their introduction into the reaction zone at any intermediate part thereof, to aid in maintaining the reaction temperature.

The isomerization according to the process of the invention may be executed at temperatures ranging from the minimum temperature at which the catalyst can be maintained in the liquid state up to approximately 200° C. The minimum temperature at which the catalyst can be maintained in the liquid state depends upon the particular composition of the ternary melt used. When isomerizing normal pentane, temperatures not substantially above about 100° C. are used. When isomerizing normal butane, higher temperatures, for example, in the range of from about 100° C. to about 150° C., are preferred.

The process of the invention may be effected in the vapor or liquid phase. Butane is preferably isomerized in the vapor phase, whereas hydrocarbons having more than four carbon atoms to the molecule are preferably isomerized in the liquid phase. The ternary catalyst melts used in the process of the invention, due to their ability to provide more efficient contact between the catalyst and the hydrocarbon being treated, and their fluidity at comparatively low temperatures, can be applied with particular advantage to the execution of the isomerization in the liquid phase. When effecting the isomerization in the vapor phase, pressures ranging from about atmospheric up to about 250 pounds p. s. i. are usually most advantageously employed. When effecting the isomerization in the liquid phase, the pressure is of course always sufficiently high to maintain at least a substantial portion of the hydrocarbon feed in the liquid phase at the operating temperature. Higher pressures may, however, be used.

The process of the invention may be effected in a batch, intermittent or continuous manner. The process lends itself particularly well to continuous operation. Any suitable reaction zone enabling efficient contact of the fluid catalyst and the hydrocarbon or hydrocarbons to be isomerized may be used. Thus the reaction zone may comprise one or a plurality of reaction chambers containing the catalyst melt, connected in parallel or in series, and provided with suitable means for maintaining the desired temperature therein. The reactors are preferably provided with suitable stirring means to insure adequate contact of catalyst and hydrocarbons. If desired, the reaction zone may comprise an elongated reaction zone of restricted cross-sectional area, such as an externally heated coil through which an admixture of hydrocarbon feed admixed with the catalyst melt may be passed. Effluence from the reaction zone may be passed to a suitable separating zone wherein entrained catalyst is removed therefrom and recirculated to the reaction zone. Hydrogen halide promoter and unconverted hydrocarbons are separated from the reaction products and may be recycled in part or in their entirety to the inlet or any intermediate part of the reaction zone. If desired, the effluence from the reaction zone may be directly combined with olefinic hydrocarbons and subjected to alkylating conditions to effect the alkylation of the branched chain hydrocarbons with olefinic hydrocarbons.

The following examples will serve to illustrate the process of the invention, it being understood that the values given are illustrative rather than limitative.

*Example I*

Normal butane was treated with a catalyst melt consisting of aluminum chloride, sodium chloride and potassium chloride in the weight ratio of 8:1:1 under the following conditions:

Temperature _____°C__ 100
Contact time_____minutes__ 30
Normal butane
  per cent by weight of the total charged__ 55
Catalyst _____do____ 39
Hydrogen chloride _____do____ 6

The conversion of n-butane to isobutane was 26%, that is, the hydrocarbon product contained 26% isobutane.

*Example II*

Normal butane was treated with a catalyst melt of the same composition as that used in Example I under the following conditions:

Temperature _____°C__ 100
Contact time_____minutes__ 30
Normal butane charged_____grams__ 300
Catalyst charged _____do____ 210
HCl charged _____do____ 40
Total pressure _____lbs__ 420

The conversion of n-butane to isobutane was 27.3%.

*Example III*

Normal butane was treated with a catalyst melt of the same composition as that used in the foregoing examples under the following conditions:

Temperature _____°C__ 120
Contact time_____minutes__ 15
Normal butane charged_____grams__ 243
HCl pressure_____lbs__ 200
Catalyst charged_____grams__ 300
Total pressure_____lbs__ 500

The conversion of n-butane to isobutane was 38.3%.

*Example IV*

Normal pentane was treated with a catalyst melt of the same composition as that used in the foregoing examples, under the following conditions:

Temperature _____°C__ 100
Contact time_____minutes__ 15
Normal pentane charged_____grams__ 354
HCl charged_____do____ 3
Catalyst charged_____do____ 232
Total pressure_____lbs__ 90

The conversion of normal pentane to isopentane was 22%.

This application is a continuation-in-part of co-pending application Serial No. 387,463, filed April 8, 1941, and which has issued as Patent No. 2,291,376, July 28, 1942.

I claim as my invention:

1. A process for the conversion of normal and branched chain saturated hydrocarbons to branched and more highly branched chain saturated hydrocarbons which comprises contacting an isomerizable saturated hydrocarbon under isomerization conditions with a fluid melt consisting of a ternary mixture of aluminum chloride, sodium chloride and potassium chloride in the weight ratio of about 8:1:1, respectively.

2. A process for converting pentane to isopentane which comprises contacting pentane in the liquid phase with a fluid melt consisting of a ternary mixture of aluminum chloride, sodium chloride and potassium chloride in the weight ratio of about 8:1:1, respectively, at a temperature not exceeding about 110° C.

3. A process for the conversion of normal and branched chain saturated hydrocarbons to branched and more highly branched chain saturated hydrocarbons which comprises contacting an isomerizable saturated hydrocarbon with a fluid melt consisting of a ternary mixture of 57 to 70 mol per cent aluminum chloride, 7.5 to 39 mol per cent sodium chloride and 0.5 to 27 mol per cent potassium chloride, at a temperature not exceeding about 110° C.

4. A process for isomerizing saturated hydrocarbons which comprises contacting an isomerizable saturated hydrocarbon under isomerization conditions with a fluid melt consisting of a ternary mixture of 57 to 70 mol per cent aluminum chloride, 7.5 to 39 mol per cent sodium chloride and 0.5 to 27 mol per cent potassium chloride.

5. A process for converting butane to isobutane which comprises contacting butane under isomerization conditions with a fluid melt consisting of a ternary mixture of aluminum chloride, sodium chloride and potassium chloride, the aluminum chloride being present in molecular excess.

6. A process for converting normal or branched chain paraffin hydrocarbons to branched or more highly branched chain paraffin hydrocarbons which comprises contacting the paraffin hydrocarbon under isomerization conditions with a fluid melt consisting of a ternary mixture of aluminum chloride, sodium chloride and potassium chloride, the aluminum chloride being present in molecular excess.

7. A process for converting normal or branched chain saturated hydrocarbons to branched or more highly branched chain saturated hydrocarbons which comprises contacting an isomerizable saturated hydrocarbon under isomerization conditions with a fluid melt consisting of a ternary mixture of aluminum chloride, sodium chloride and potassium chloride, the aluminum chloride being present in molecular excess.

8. A process for converting a normal or branched chain paraffin hydrocarbon to a branched or more highly branched chain paraffin hydrocarbon which comprises contacting the paraffin hydrocarbon under isomerization conditions with a fluid melt consisting of a ternary mixture of a halide of aluminum, a halide of sodium and a halide of potassium, the aluminum halide being present in molecular excess.

9. A process for isomerizing saturated hydrocarbons which comprises contacting an isomerizable saturated hydrocarbon under isomerization conditions with a fluid melt consisting of a ternary mixture of a halide of aluminum, a halide of sodium and a halide of potassium, the aluminum halide being present in molecular excess.

10. A process for isomerizing saturated hydrocarbons which comprises contacting an isomerizable saturated hydrocarbon in the presence of a promoting amount of a hydrogen halide under isomerization conditions with a fluid melt consisting of a ternary mixture of a halide of aluminum, a halide of sodium and a halide of potassium, the aluminum halide being present in molecular excess.

11. A process for isomerizing saturated hydrocarbons which comprises contacting a hydrocarbon fraction essentially comprising saturated hydrocarbons having from four to ten carbon atoms to the molecule under isomerization conditions with a fluid melt consisting of a ternary mixture of a halide of aluminum, a halide of sodium and a halide of potassium, the aluminum halide being present in molecular excess.

HARRY A. CHENEY.